: 2,856,403
Patented Oct. 14, 1958

2,856,403

PROCESS FOR PREPARING 3-ESTERS OF 11α:23-DIBROMOHECOGENIN

John Christopher Hamlet, Eastcote, Pinner, Alexander Crawford Ritchie, Harrow, and Leonard James Wyman, Southall, England, assignors to Glaxo Laboratories Limited, Greenford, Middlesex, England, a British company No Drawing. Application August 8, 1955
Serial No. 527,115

Claim priority, application Great Britain August 16, 1954

11 Claims. (Cl. 260—239.55)

The present invention is concerned with improvements in or relating to the bromination of the 3-esters of hecogenin to yield the 3-esters of 11:23-dibromohecogenin. This reaction is the first step in a variety of syntheses which have been proposed for the preparation of cortisone from hecogenin, which is a readily available starting material in a number of countries, and which reaction has already been described by the following authors, who used the stated solvents as the bromination medium. Djerassi, Mancera, and Rosenkranz, J. Org. Chem., 1951, 16, 303, used acetic acid for the bromination: Mueller et al., J. Amer. Chem. Soc., 1953, 75, 2400, used acetic acid; Mueller et al., J. Amer. Chem. Soc., 1953, 75, 4892, used chloroform and Cornforth et al., J. C. S., 1954, 947, also used chloroform. Acetic acid and chloroform have thus been proposed hitherto as the solvents for this bromination reaction and in addition all the reactions described by the above authors were single phase reactions.

We have investigated this reaction with a view to finding an improved medium because we have found that the two solvents previously proposed are not satisfactory. Reactions in these media were found to be erratic and other investigators have evidently had a similar experience, see for example, Mueller and his co-workers (J. Amer. Chem. Soc., 1953, 75, 4892) who state that although the yield of crude product is nearly quantitative, the reaction is erratic, going sometimes with little colour development but more often with the formation of green, blue or purple side products. Material contaminated with these coloured products decomposes on standing, even in the dry state.

It will be noted that the two solvents previously used, namely acetic acid and chloroform, are both polar solvents and it may be said that polar solvents are usually chosen for reactions where the bromination takes place by substitution; however we have now found that substantially non-polar organic solvents which do not themselves undergo substantial bromination under the reaction conditions (that is are "inert") are particularly satisfactory solvents for the bromination of 3-esters of hecogenin and that their use gives rise to good yields of the desired 3-esters of 11:23-dibromohecogenin, the reaction becomes more predictable and the formation of coloured by-product tending to cause decomposition of the dibromohecogenin esters is substantially avoided. Suitable non-polar organic solvents are, for example, benzene and dioxan.

According to the present invention, therefore, we provide a process for the production of 3-esters of 11:23-dibromohecogenin by bromination of 3-esters of hecogenin in which the bromination is carried out in an inert substantially non-polar organic solvent for the hecogenin ester.

A particularly suitable starting material is hecogenin 3-acetate.

According to a feature of the present invention, the solvent is benzene or dioxan.

The quantity of bromine to be used in the reaction should preferably be between 2.0 and 2.5 moles per mole of the starting ester and we prefer to use 2.3 moles. Although the bromination reaction can be conducted quite satisfactorily with a solution of the starting ester, it has been more convenient in practice to avoid large reaction volumes and it has been found possible to use a suspension of the ester in the solvent, that is only a part of the ester being in solution. Concentrations of up to 25% w./v. may be used but we prefer a concentration of about 12.5% w./v.

The temperatures at which the reaction should be carried out should preferably be within the range of approximately 5–30° C., but within this range the preferred temperature of operation varies with the solvent used. Thus we prefer to carry out the reaction at approximately 15° C. when using benzene and at 20–25° C. when using dioxan.

When working on a small scale (e. g. less than 100 g.) very little trouble is experienced in working up the bromination product, but on increasing the scale we find that increasing difficulty occurs due to the decomposition of bromination by-products which were present in solution. It is important that destruction of these by-products should be avoided since it has been shown recently by Mueller et al., (J. Amer. Chem. Soc., 1954, 76, 749) that the dibromination of hecogenin acetate results in the formation of four different dibromides due to isomerism at positions 11 and 23. It is consequently improbable that a very high yield of any single isomer can be achieved and the overall efficiency of the process must necessarily depend to a great extent on recovery of the hecogenin ester starting material by debromination of mother liquors containing the mixed isomers.

Although we do not wish to be limited by theoretical considerations we believe that hydrogen bromide plays a very important part in the reaction leading to the formation of crystalline 11α:23-dibromohecogenin esters. We thus consider that whereas a large excess of hydrogen bromide, particularly at elevated temperatures, can cause destruction of the brominated products, a limited amount of this substance is desirable to effect epimerisation of the initially formed bromination product to the desired isomer during the course of the reaction. When carrying out the bromination reaction, particularly on a larger scale, therefore, we prefer to reduce the concentration of hydrogen bromide in the reaction mixture immediately after the addition of the bromine; this may conveniently be effected by applying a partial vacuum to the system and simultaneously allowing a current of air to sweep over the surface of the liquid. After the reaction mixture has been allowed to stand in the presence of the limited quantity of hydrogen bromide, the latter, together with any unconsumed bromine, is removed from the solvent for example by any suitable washing procedure and the product is then isolated.

We have found that when the bromination reaction is carried out in this manner using benzene as the solvent, the benzene solution of the product appears to be reasonably stable to the subsequent heat treatment necessary for the removal of the benzene and subsequent crystallisation from, for example, alcohol. In this manner direct yields of crystalline 11α:23-dibromohecogenin acetate of 60–65% have been obtained and, taking into account recovered hecogenin acetate, which can be obtained by debromination of the product from the crystallisation liquors with, for example, zinc and acetic acid, overall yields of about 85% have been achieved.

During the addition of bromine to the solution or suspension of the starting material, stirring or agitation is normally desirable and cooling may be necessary, the bromine being added as rapidly as possible without appreciable temperature rise, in any event we prefer that the temperature should not rise above about 30° C. When working on a larger scale, a partian vacuum is then applied, a suitable pressure being, for example, 20–56 cm. Hg. The reaction mixture is left for preferably 20–40 minutes and the excess hydrogen bromide and bromine are then removed by any suitable washing procedure, using, for example, sodium bicarbonate and sodium thiosulphate respectively. The product can then be isolated and the procedure for doing this will vary with the solvent used.

Where benzene is used, this may be removed by evaporation and the residue is crystallised from any suitable solvent, such as alcohol. Dioxan has the virtue of being water miscible and the crude dibromosapogenin can therefore be precipitated by the addition of water, thus avoiding the use of heat for removal of the solvent. The crude product obtained by precipitation may be filtered off, dried and stirred with methanol to remove impurities. Using dioxan as the solvent, direct yields of 50–60% of crystalline $11\alpha:23$-dibromohecogenin acetate and overall yields of approximately 75% have been obtained, the latter being based on hecogenin acetate not recovered.

The final purification step, either by crystallisation where benzene was used as the solvent or by stirring with, for example, methanol where dioxan was used, need not be carried out where only a crude product is required, for example, as the starting material for the preparation of the ketol diacetate.

In order that the invention may be well understood the following examples are given by way of illustration only:

Example 1

Hecogenin acetate (100 g.) in benzene (750 ml.) was cooled to about 15° C. and a few drops of a solution of bromine (25 ml.) in benzene (25 ml.) added with vigorous stirring. After an induction period of about 2 minutes, the colour was discharged and the remainder of the bromine-benzene solution was added over a period of 1 minute with external water cooling. The pressure in the reaction vessel was reduced immediately to about 56 cm. of mercury and, simultaneously, a stream of air was passed through the apparatus and over the reaction mixture. The mixture was then stirred for a further 20 minutes. Aqueous sodium bicarbonate (30 g. sodium bicarbonate in 400 ml. of water) was added, followed, after a few minutes, by aqueous sodium thiosulphate (10 g. in 50 ml. water). The organic layer was separated, washed with water (2 x 400 ml.) and the benzene removed to small bulk by distillation in vacuo at 40° C. Warm methylated spirit (1.4 l.) was added and the last traces of benzene removed by distillation in vacuo to a final volume of 900 ml. The suspension was filtered while still slightly warm, washed with methylated spirit and dried.

Yield=82.6 g. (61.8% of theory) $[\alpha]_D = -39.1°$, M. P. 178° C. (dec.).

The alcoholic mother liquors were taken to dryness and the residue dissolved in glacial acetic acid (300 ml.). Zinc dust (60 g.) was added and the whole refluxed for 2 hours. The zinc was removed by hot filtration and the crude hecogenin acetate precipitated by addition of water to the filtrate. This was recovered by filtration and washed with methylated spirit to give a colourless solid. Yield=28.9 g. $[\alpha]_D = -3.0°$, (CHCl$_3$) M. P. 240–44° C.

Yield of dibromide allowing for recovery of hecogenin acetate=91.4%.

Example 2

Hecogenin acetate (1000 g.) in benzene (7500 ml.) was treated as above with bromine (250 ml.) in an equal volume of benzene, addition being effected over a period of 3 minutes. After allowing the reaction mixture to stand for 30 minutes at a pressure of 30 cm. of mercury the crystalline $3\beta$-acetoxy-$11\alpha:23$-dibromohecogenin acetate was isolated in a manner similar to that described in Example 1.

Yield=790 g. (59.1% of theory). $[\alpha]_D = -39°$. (CHCl$_3$) M. P. 182° C. (dec.).

Example 3

A solution of hecogenin acetate (10 g.) in sodium dried dioxan (250 ml.) at 22° C. was stirred mechanically during the addition over two minutes of pure bromine (2.25 ml.; 2.1 mole). Evolution of hydrogen bromide began at once and the bromine was rapidly absorbed. After being stirred for a further 30 minutes, the solution was poured into water (2.5 litres). The amorphous precipitate was filtered off, washed with water, transferred to a beaker and stirred mechanically with methanol (250 ml.) at 22° C. to yield crystalline $11\alpha:23$-dibromohecogenin acetate, which was filtered off, washed with a little methanol, and dried.

Yield 7.50 g. (54.7% of theory), M. P. 179° C. (dec.) $[\alpha]_D = -39°$. (CHCl$_3$). Ionisable bromine 12.63%.

The methanol filtrate was treated with acetic acid (5 ml. and zinc dust (2 g.), and the mixture was stirred for 15 minutes. The crystalline deposit was filtered off and crystallised from chloroform/methanol to yield 23-bromohecogenin acetate (2.15 g.; 18%) suitable for rebromination.

Whilst the invention has been described with particular reference to the bromination of hecogenin acetate it will be apparent to those skilled in the art that many other acylesters of hecogenin can be brominated in a like manner. The invention is particularly applicable to esters of hecogenin and saturated aliphatic acids, particularly such acids as contain from 2–8 carbon atoms. Such acids may also be substituted with substituents which do not react wtih bromine under the conditions of the reaction, such as halogen, alkoxy, phenyl and nitro substituents. Particularly preferably are hecogenin esters of acetic, propionic, butyric isobutyric, caproic, capryllic, chloracetic and phenylacetic acids. Esters of aromatic acids such as benzoic, toluic and naphtoic acids may also be used.

We claim:

1. A process for preparing a 3-ester of $11\alpha:23$-dibromohecogein, comprising brominating a 3-ester of hecogenin with 2.0 to 2.5 moles of bromine per mole of said starting ester at a temperature of 5–30° C. in a reaction medium consisting essentially of an organic solvent selected from the group consisting of benzene and dioxan; and separating the 3-ester of $11\alpha:23$-dibromohecogenin so produced from the reaction medium.

2. A process as claimed in claim 1 wherein the starting ester is hecogenin 3-acetate.

3. A process as claimed in claim 1 wherein said solvent is benzene and the temperature of bromination is approximately 15° C.

4. A process as claimed in claim 1 wherein said solvent is dioxan and the temperature of bromination is within the range of 20–25° C.

5. A process as claimed in claim 1 wherein there is employed approximately 2.3 moles of bromine per mole of starting ester.

6. A process as claimed in claim 1 wherein the starting ester is only partially dissolved in said solvent.

7. A process as claimed in claim 1 wherein there is employed a concentration of starting ester in solvent of up to 25% w./v.

8. A process as claimed in claim 7 wherein there is employed a concentration of about 12.5% w./v.

9. A process as claimed in claim 1 wherein the concentration of hydrogen bromide in the reaction mixture is reduced after the addition of bromine is substantially complete.

10. A process as claimed in claim 9 wherein the concentration of hydrogen bromide is lowered by applying a partial vacuum to the system and simultaneously sweeping the surface of the reaction mixture with a stream of air.

11. A process as claimed in claim 10 wherein a pressure of 20 to 26 cm. Hg is employed.

References Cited in the file of this patent
UNITED STATES PATENTS 2,340,388     Inhoffen _____ Feb. 1, 1944

OTHER REFERENCES

Chem. and Industry, pp. 919–20, Aug. 29, 1953.